United States Patent [19]
Davis et al.

[11] 3,736,433
[45] May 29, 1973

[54] DIAGNOSTIC UNIT

[75] Inventors: Forrest Wm. Davis, Altadena; Lamont J. Seitz, Huntington Beach, both of Calif.

[73] Assignee: Baxter Laboratories, Inc., Morton Grove, Ill.

[22] Filed: July 6, 1971

[21] Appl. No.: 160,044

Related U.S. Application Data

[63] Continuation of Ser. No. 809,318, March 21, 1969, abandoned.

[52] U.S. Cl..............250/218 R, 250/214, 250/227, 324/115
[51] Int. Cl. ............................................G01n 21/26
[58] Field of Search.....................250/218, 227, 214; 324/156, 115

[56] References Cited

UNITED STATES PATENTS

| | | | |
|---|---|---|---|
| 3,594,086 | 7/1971 | Hughes | 324/115 |
| 2,891,438 | 6/1959 | Fohrman | 324/115 |
| 3,025,962 | 3/1962 | Williams | 250/218 |
| 3,502,412 | 3/1970 | Burns | 250/218 |
| 3,319,514 | 5/1967 | McAllister | 250/218 |
| 2,427,013 | 9/1947 | MacAdams | 250/218 |
| 3,470,261 | 9/1969 | Roberts | 250/218 |
| 3,164,663 | 1/1965 | Gale | 250/227 |
| 2,356,238 | 8/1944 | Gillet | 250/218 |
| 1,763,178 | 6/1930 | Pierce | 324/156 |

*Primary Examiner*—James W. Lawrence
*Assistant Examiner*—D. C. Nelms
*Attorney*—Walter C. Kehm and Robert G. Pollock

[57] ABSTRACT

An improved probe photometer type of diagnostic unit is provided which includes a light source, a probe having light transmitting means for conducting light from the source and a photocell light receiving means spaced therefrom, an electronic amplifying circuit electrically connected to the output of the photocell and an electric meter connected to the output of the amplifying circuit, and a transparent removable slide member which is inserted into the unit for a particular test, providing a scale for the meter so that it may indicate direct readings corresponding to the particular test being conducted.

1 Claim, 6 Drawing Figures

Patented May 29, 1973
3,736,433
4 Sheets-Sheet 1
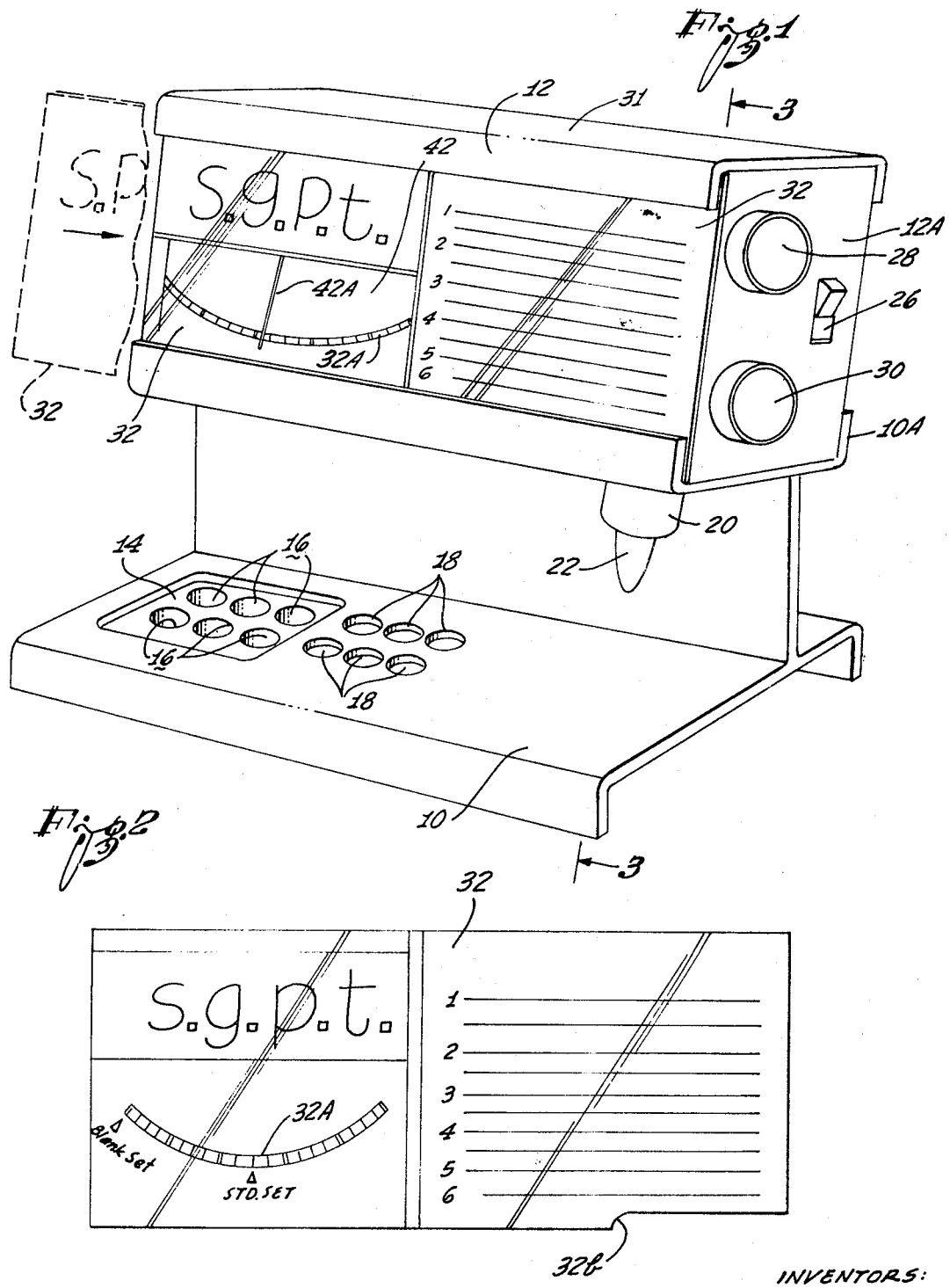
INVENTORS:
Forrest Wm. Davis
Lamont J. Seitz
By Walter C. Kehm
ATTORNEY

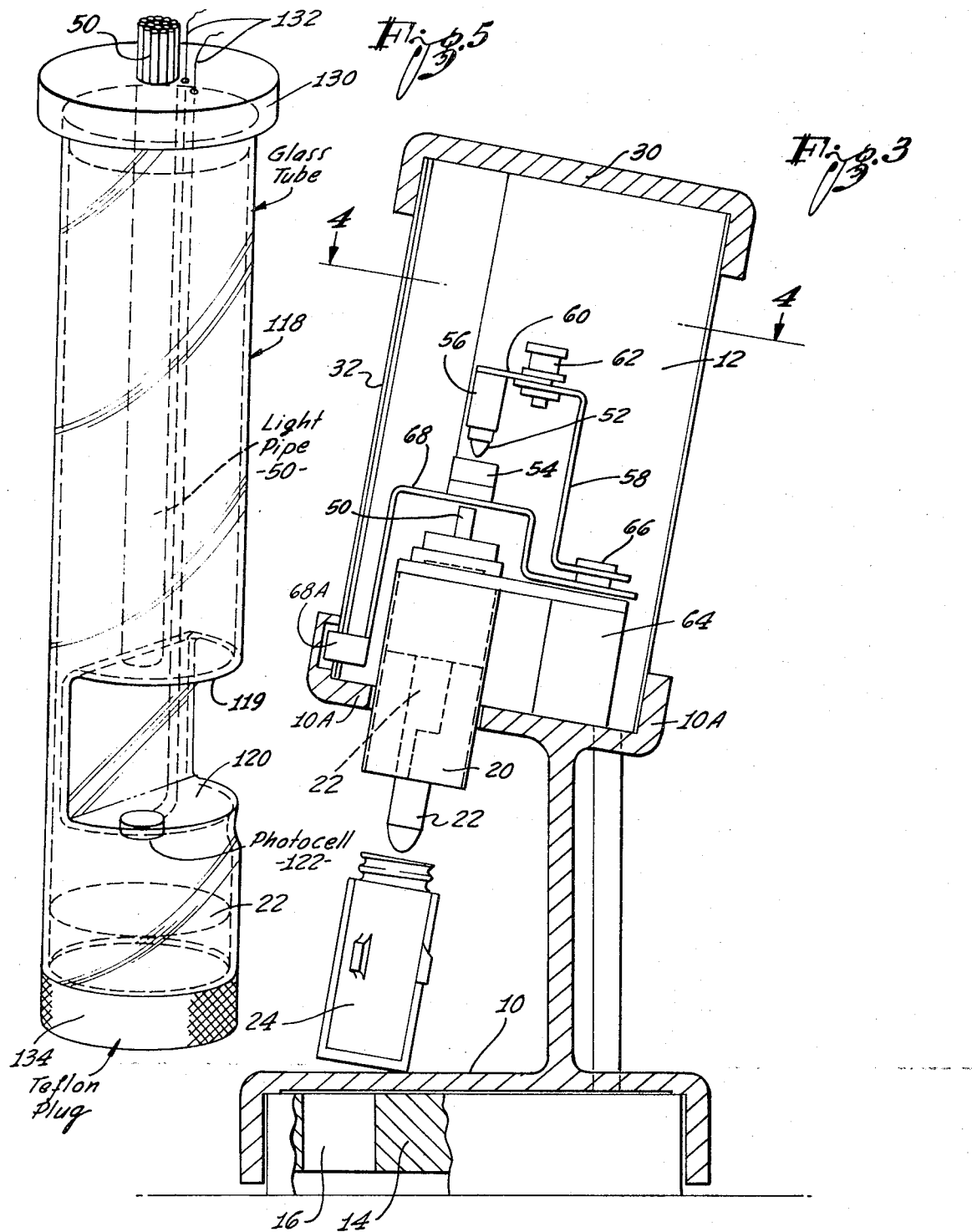

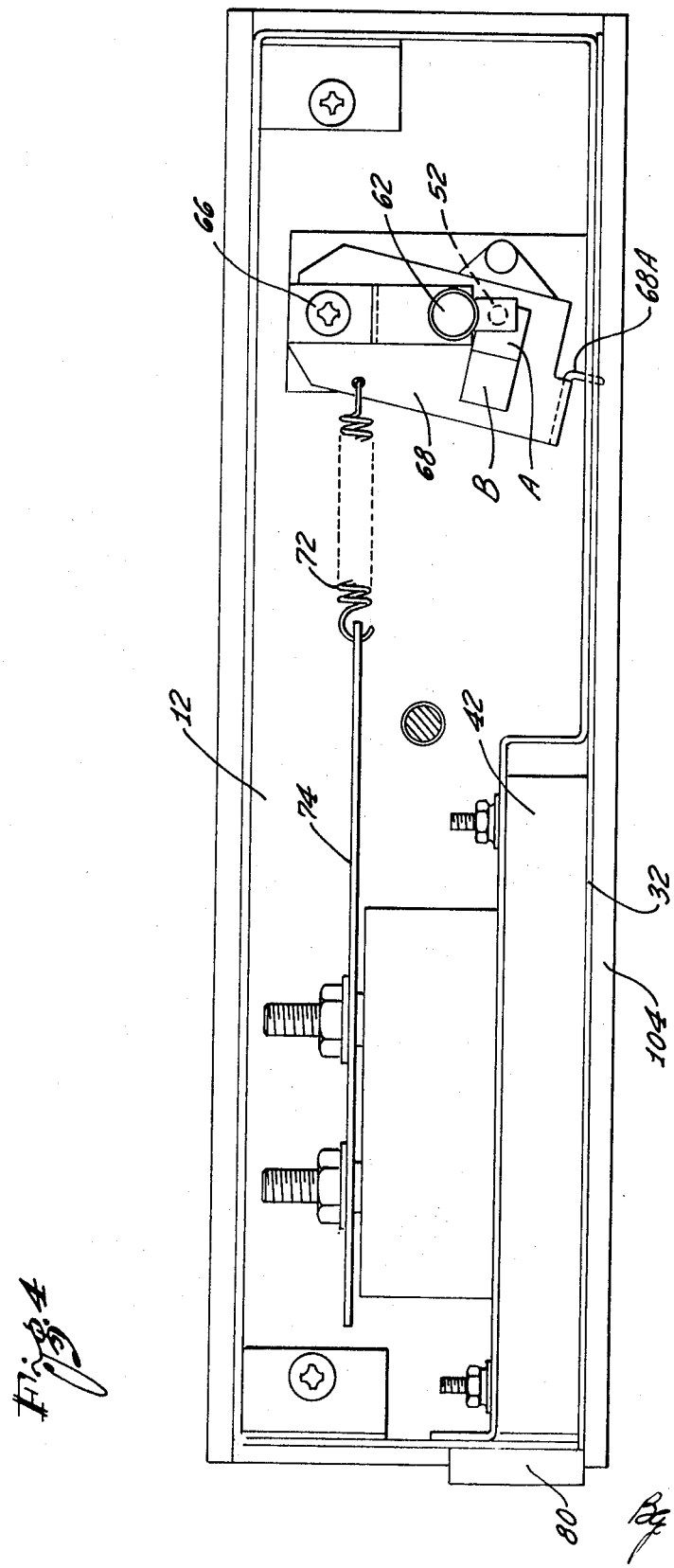

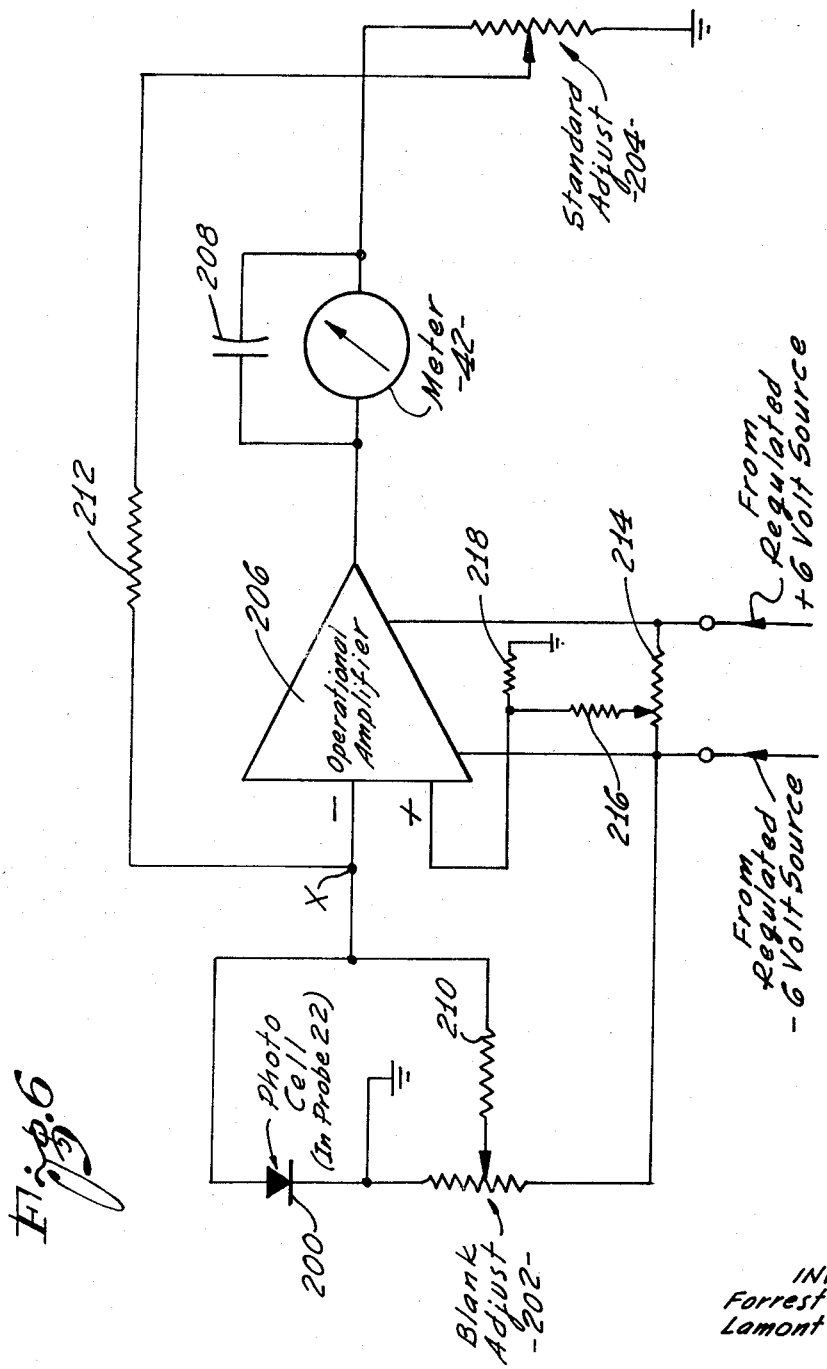

DIAGNOSTIC UNIT

This application is a continuation of Ser. No. 809,318 filed 3-21-69, now abandoned.

BACKGROUND OF THE INVENTION

Diagnosis of body disorders and diseases increasingly relies upon clinical laboratory analysis of body fluids such as blood, serum, urine and the like by photometric means, generally carried out by passing a selected wavelength of light through a fluid sample toward a photocell before, during or after a particular reagent or test solution is added. An electric meter connected to the photocell provides a measurement of the optical transmission of the sample being tested. In order to provide the greatest accuracy and reading of optical density or color, it is desired that the light be generated, passed through the solution and received by the photocell without distortion or diffusion caused by glass containers, tubes or the like. Thus, a diagnostic unit having a probe in which is contained a light source and a light receiving source spaced therefrom would be highly valuable to a doctor or a clinical laboratory.

The technique described in the preceding paragraph can be used for many diagnostic tests, such as the cholesterol, glucose, uric acid, hemoglobin, S.G.O.T., S.G.P.T., and so on. The unit of the present invention permits clinical tests, such as those listed above, to be made simply and easily directly in the physician's office, and without the need for skilled clinical technicians or extraneous calculations.

The diagnostic unit to be described, for example, includes a plurality of incubation wells, which are established either at room temperature, for example, or at normal body temperature of 37+C. The appropriate reagent for each test is supplied in pre-packaged vials or test tubes. To conduct any particular test, the patient's fluid is pipetted into the appropriate reagent, and the test tube containing the resulting solution is incubated, if desired, for that particular test. A transparent slide member corresponding to the test to be conducted is then slipped across the face of the diagnostic unit, and the selected slide member has a transparent portion which is positioned in front of the photometer electric meter.

The transparent slide may also have a second portion on which operating instructions for the particular test are inscribed. The slide member provides a properly calibrated scale for the meter in correspondence with the test being conducted. It will be understood, of course, that other slides are available with the diagnostic unit for the other tests to be conducted thereby.

The electric meter may have a mirror behind its pointer to avoid errors due to parallax. When such a mirror backing is provided, the operator merely lines up the meter pointer and its reflection with the corresponding scale indicia on the slide to obtain the proper accurate reading.

When the transparent slide member corresponding to the particular test is moved into place in the diagnostic unit, it has a notch which engages a projection on an optical filter wheel, or the like, and which automatically moves the wheel so that an optical filter appropriate for the particular test being conducted is moved into place in the optical path of the photometer. If no filter is required for a particular test, no filter is positioned in the optical path when the slide member corresponding to that test is slipped into place. That is, such a slide member causes the filter wheel to move to a position in which a void is placed in the optical path of the photometer.

After the sample to be tested has been incubated, it is moved by hand up under a downwardly protruding tip of the probe in the diagnostic unit, and the unit is energized. The resulting output from the photometer is displayed by the aforesaid electric meter, and the scale provided by the particular transparent slide member in the unit provides a direct reading for the particular test being conducted, so that no calculations are required.

To render the probe in the diagnostic unit immune to changes in ambient light conditions, both it and the test tube of the solution being tested may be made of an opaque plastic or glass, or of glass or plastic which is tinted brown, or other suitable color.

BRIEF DESCRIPTION OF THE DRAWINGS

FIG. 1 is a perspective of one embodiment of the improved diagnostic unit of the invention;

FIG. 2 is an elevation view of a replaceable transparent slide member which is removably inserted across the front wall of the unit of FIG. 1;

FIG. 3 is a side section of the unit of FIG. 1, taken on the line 3—3 of FIG. 1, showing the probe included in the unit, and certain operating components associated with it;

FIG. 4 is a section, essentially along the line 4—4 of FIG. 3, and showing the top of the various internal components of the unit;

FIG. 5 is a representation of a probe which may be used in the diagnostic unit of the invention, and which is similar to the probe described in the copending application Ser. No. 706,112, filed Feb. 16, 1968; and FIG. 6 is a circuit diagram of a suitable amplifier for use in the unit.

DETAILED DESCRIPTION OF THE ILLUSTRATED EMBODIMENT

The diagnostic unit shown in FIG. 1, for example, includes a bracket 10 which forms a base for the unit, and which also serves as a support for a housing 12. The base portion of the bracket 10 includes, for example, a heat block 14 which includes a first plurality of incubation wells 16, and which may receive individual test tubes of the solutions to be tested, so that the solutions may be incubated, for example, at the normal body temperature of 37°C. Another series of wells 18 may also be included in the base 10 to serve as a support for test tubes of solutions which are to be tested, for example, at room temperature.

As indicated above, test tubes may be obtained by the physician which are pre-packaged to contain the reagents required for the various tests. When a particular test is to be made, the appropriate test tubes are placed in the wells 16 and 18, and the corresponding patient's fluid on which the test is to be conducted is pipetted into the test tubes. The test tubes are incubated to the desired temperature, if required. Then, a test tube containing the solution to be tested is moved up and into a tube 20 depending from the underside of the housing 12 and surrounding the lower end of a probe 22.

The tube 20 forms a light shield for the test tube 24 (FIG. 3) and the solution contained in the test tube and which is to be tested by the unit. Both the test tube and the probe 22 may be composed of opaque or brown tinted glass or plastic, so as to eliminate the effects of ambient light conditions. In this way, although the photometer such as described in the aforesaid copending application Ser. No. 706,112, may be used, there is no need for the light chopper described in the aforesaid copending application in order to nullify the effects of changes in ambient light conditions.

The diagnostic unit is energized by controlling appropriate electric circuits by means of a switch 26 which is mounted on a control panel 12A at one end of the housing 12. Blank adjust and standard adjust controls may also be provided, for example, by knobs 28 and 30.

As shown in FIG. 1, for example, the bracket 10 has a U-shaped upper portion 10A which supports the housing 12. The forward end of the support portion 10A forms a flange, as does the forward edge of a top bracket 31 of the housing 12, so that a replaceable transparent slide member 32 composed, for example, of clear plastic, or equivalent material, may be inserted across the front wall of the housing 12.

The transparent slide member 32 (FIG. 2) is representative of the particular test to be conducted by the diagnostic unit, the test itself being incribed, for example, on the slide member such as "S.G.P.T.", as shown. Also, various operating instructions for the particular test may also be inscribed on the replaceable slide member 32.

For any particular test, the physician, for example, selects a slide member 32 corresponding to that test and slips it in place into the unit, such as shown in FIG. 1. The slide member 32, as shown in FIG. 2, for example, contains calibrations 32A which form a scale for the pointer 42A of an electric meter 42. The meter 42 is mounted in the housing 12, and is electrically connected to the probe and its associated amplifier circuits, so as to measure its electrical output. The scale 32A on the slide member 32 provides a properly calibrated scale for the pointer 42A for the particular test represented by the removable member 32, so that a direct reading may be made for that particular test.

The meter 42 may have a mirror on its front face directly back of the pointer 42A, so that a proper reading may be made merely by lining up the pointer 42A with its reflection, and with the corresponding indicia 32A, so that parallax errors may be eliminated.

As shown in FIG. 2, for example, the replaceable slide member 32 is provided with a notch 32b, and this notch, as will be described, is effective in positioning the proper filter in the optical path of the probe 20 to correspond to the particular test represented by the replaceable member 32.

Therefore, in order to conduct any particular test, it is merely necessary for the physician to insert the corresponding slide member 32 into the diagnostic unit. The slide member 32 corresponding to that test contains all the instructions necessary for carrying out the test. In addition, the insertion of the slide member 32 automatically places the proper optical filter (or no filter) in the photometer optical path for that test, and automatically provides the properly calibrated scale for the electric meter 42, so that direct readings for the particular test are provided by the meter.

Then, the physician merely inserts the patient's fluid into the proper pre-packaged reagent test tube, and after incubation in the wells 16, if required, the test tube is inserted up into the tube 20, and the meter 42 immediately provides the required measurement on a direct scale.

As more clearly shown in FIG. 3, for example, and in a manner similar to the probe photometer of the copending application Ser. No. 706,112, as shown in FIG. 5, a light guide 50 is provided in the probe 22, and light from an incandescent bulb 52 is directed through a filter unit 54 to the light guide, to be conducted down the light guide 50 to the operating parts of the probe. The light bulb 52 is mounted in a socket 56 which, in turn, is supported on a bracket 58. The position of the socket 56 and light bulb 52 may be adjusted relative to the bracket 58 by means of a sliding bracket 60, the brackets 60 and 58 being secured together, by means, for example, of a screw 62.

The bracket 58 is supported on a spacer post 64 within the housing 12 by means, for example, of a screw 66, and a bracket 68 for the filter 54 is pivotally supported on the spacer 64 by means of the screw. The bracket 68 has a U-shaped configuration, and its forward portion extends down the front wall of the housing 12 to terminate in a leaf-like extremity 68A.

As shown in FIG. 4, a spring 72 is coupled to the pivotally mounted bracket 68 and to a stationary support bracket 74 which is mounted in the housing 12. The spring 72 biases the bracket 68 in a clockwise direction in FIG. 4, so that the leaf-like member 68A is normally moved to the left to place, for example, a filter A in the optical path of the light bulb 52. However, when a replaceable slide member 32 is moved into position across the front wall of the housing 12, it may have a notch formed therein whose side engages the leaf 68A to swing the bracket 68 in a counterclockwise direction, against the tension of the spring 72, so as to place, for example, a filter B in the optical path from the light 52 to the probe.

Therefore, by properly locating the notches in the different replaceable members 32, either filter A or filter B may be placed in the optical path. It will be appreciated, of course, that additional filters may be included on the pivotal bracket 68, and also that certain filters may be omitted, so as to leave a void space in the bracket for certain positions established by the replaceable slides 32.

A resilient catch 80 is provided at the other end of the housing to hold the slide member 32 in place. When the catch 80 is pressed back out of the way, the spring 72 causes the leaf-like member 68 to move the slide member 32 to the left in FIG. 4 and cause it to move partically out of the housing 12, so as to facilitate its complete removal.

The probe 22 may be constructed in a manner similar to the probe of the aforesaid copending application Ser. No. 706,112, and as shown, for example, in FIG. 5. As shown in FIG. 5, for example, the probe may include a probe-like member 118 formed, for example, of a glass tube. The glass tube is configured, as described in the copending application so as to define a pair of spaced apart surfaces 119 and 120. However, the original passage through the tube is maintained in an unblocked condition around the deformed section. A photocell 122 of any appropriate type is mounted within the tube adjacent the surface 120. The light pipe 50 is also mounted within the tube, and it extends longitudinally down the tube so that its lower end is positioned adjacent the surface 119. A usual electric plug 130 may be mounted at the upper end of the tube, the plug having a plurality of prongs 132, as shown. The light pipe itself may extend up through a central aperture in the plug as also shown.

The lower end of the tube may be closed by a plug 134 formed, for example, of Teflon, or other appropriate material. The wires from the photocell 122 extend up the hollow passage in the tube, and these wires may be connected to appropriate pins 132 of the plug 130.

An appropriate electronic amplifier circuit for coupling a photocell 200 in the probe 22 to the meter 42 is shown in FIG. 6. In this circuit the "blank adjust" knob 28 controls a potentiometer 202 to set the meter 42 to "0" or reference calibration setting when a "blank" sample is sensed by the probe 22. This blank sample is used, for example, to set the meter to zero optical density for any particular test, even though the blank itself does not exhibit 100 percent optical transmission. This permits a full use of the meter scale to be realized. For example, the "blank" sample in a plasma test may include all the chemicals to be utilized with the exception of the plasma itself.

The knob 30 is used to control a potentiometer 204. The latter potentiometer sets the meter reading to any desired calibrated reading when a standard sample of known optical density, for example, is sensed by the probe. The potentiometer 202 may have a value of 100 kilo-ohms, and the potentiometer 204 may have a value of 500 ohms. An advantage of the two controls is that the full scale of the meter can be used for any particular test in that it can be set for zero optical density and a standard optical density at each limit of the scale, for example. An important feature of the circuit of FIG. 6, as will become evident as the description proceeds is that each adjustment may be made without affecting the other in any way.

As shown in FIG. 6, the cathode of the photocell 200 is grounded, and its anode is connected to the negative input terminal of an operational amplifier 206. The operational amplifier may, for example, be an integrated circuit of the type presently designated No. 709 and available, for example, from Fairchild Semiconductors, Inc., of Palo Alto, California.

The positive input of the operational amplifier 206 is connected to the junction of a pair of resistors 216, 218, and its output is applied to the meter 42. The meter 42 may, for example, be an inexpensive 0-1 milliampere meter. It is shunted by a capacitor 208 which has a capacity, for example, of 4,000 microfarads, and which functions as a damper for the meter to prevent violent fluctuations of its needle. The meter is connected to one terminal of the potentiometer 204, the other terminal of which is grounded.

The operational amplifier 206 is excited by a 6-volt regulated direct voltage source, which has, for example, a +6 volt terminal and a −6 volt terminal with respect to ground. The "blank adjust" potentiometer 202 is connected between the negative terminal of the source and ground. The movable arm of the potentiometer is connected to a 1.8 megohm resistor 210 which, in turn, is connected to a summing junction X with the output of the photocell 200 at the negative input of the operational amplifier 206. The resistor 210 acts as a summing resistor. A feedback resistor 212 having a resistance, for example, of 150 kilo-ohms, is connected between the potentiometer 204 and the negative input terminal of the operational amplifier 206.

The feedback resistor 212 could be connected directly from the output terminal of the operational amplifier 206 to the negative input terminal. However, the illustrated connection is preferable since it removes the resistance of the meter 42 from the circuit of the potentiometer 204. This simplifies circuit design since the value of the potentiometer 204 may be selected for a desired meter defection without the need to take the meter resistance into account.

The resistor 216 may, for example, have a resistance of 1 megohm, and it is connected to the movable arm of a potentiometer 214, the potentiometer having a resistance, for example, of 100 kilo-ohms, and being connected across the + and −6 volt terminals of the regulated direct voltage source. The resistor 218 may have a resistance, for example, of 1 kiloohm, and it is grounded.

A problem exists in that the voltage across the photocell 200 must be reduced to an absolute minimum, since the leakage through the photocell is proportional to the voltage developed across it. The resulting leakage current is a function of temperature, and is critical at the current level at which the photocell is operated in the system of the invention.

The voltage across the photocell 200 may be minimized by balancing the input to the operational amplifier 206. This may be achieved, for example, in the illustrated circuit, by connecting the positive input terminal of the operational amplifier to the junction of the resistors 216 and 218, instead of directly to ground. These resistors serve as a fractional bleeder, and the adjustment of the potentiometer 214 shifts the reference potential of the amplifier to a point at which the voltage across the photocell 200 is nulled. The potentiometer 214 is a factory adjustment, and is set to the null value, for example, at the factory.

The energy generated by the photocell appears as a positive current at the negative input of the operational amplifier 206. This positive current is bucked out by the potentiometer 202, as will be described. The resultant current is amplified and flows as a positive current through the meter 42 and through the potentiometer 204. The current also flows through the feedback resistor 212, and the tendency is to force the summing junction X towards zero potential with respect to ground. Thus the photocell 200 looks into an effective low impedance which provides for precise linear operation of the photocell.

The blank adjust potentiometer 202 sums a pre-set negative current with the output of the photocell at the summing point X. As mentioned, the function of this potentiometer is to set the current flow in the meter 42 in the presence of the "blank sample". The blank sample represents the maximum output of the photocell 200 for any particular test, and this is set to give zero meter current by the potentiometer. Then any lesser outputs from the photocell, as samples of greater than the blank optical density are tested results in a negative current at the negative input of the operational amplifier. This negative current is amplifier and flows as a positive current through the meter 42. The potentiometer 202 permits, therefore, the meter 42 to be set to "zero" for any desired blank sample, regardless of the actual percent optical transmission of the blank.

The aforesaid adjustment is made with zero current through the meter 42 and through the potentiometer 204 so that the setting of the potentiometer 204 has no effect whatever on the aforesaid blank adjustment of the potentiometer 202. After the blank adjustment has been made, the blank sample may be replaced by a standard sample, and the potentiometer 204 may be set so that the meter reading for the standard sample is such that full scale capacity of the meter 42 is used for the particular test.

Since the operational amplifier operates in conjunction with the feedback resistor 212 to maintain the summing point X at essentially zero potential, the standard adjust potentiometer 204 may now be set to any desired meter deflection for the standard sample without disturbing the previous setting of the potentiometer 202 in any way.

The disclosed circuit of FIG. 6 is advantageous in that it is simple and it employs inexpensive components. Moreover, it is simple to adjust in order to take full advantage of the meter scale, as described above. It will be appreciated, therefore, that the invention provides a simple diagnostic unit which is small and compact, and which is extremely simple to operate, and is capable of providing results for any selected tests on a directly calibrated basis.

What is claimed is:

1. A diagnostic unit for photometrically testing body fluid samples including: a housing with a base for holding the sample to be tested; a light source; a probe mounted in said housing, said probe having therein a light pipe for conducting light from said light source in an optical path positioned to be interrupted by said sample and thence to a photocell light receiving means spaced therefrom in said probe; an electric meter mounted in said housing and electrically connected to said probe, said meter including a needle observable through a wall of said housing; a moveable optical filter element pivotally mounted in said housing for selectively providing different filter conditions in the optical path of said probe; a replaceable transparent slide member representing a particular diagnostic test slideable in said housing across said wall and having indicia thereon providing a scale for said needle representing direct readings for said test, said slide member including resilient means for biasing said filter element as the slide member is inserted into said housing to insert the filter condition representative of the test in said optical path whereby said filter element is moved to a predetermined position for said particular slide member and representing the particular test represented thereby.

* * * * *